United States Patent
Miller et al.

(10) Patent No.: US 9,218,692 B2
(45) Date of Patent: Dec. 22, 2015

(54) CONTROLLING RIGHTS TO A DRAWING IN A THREE-DIMENSIONAL MODELING ENVIRONMENT

(71) Applicant: TRIMBLE NAVIGATION LIMITED, Sunnyvale, CA (US)

(72) Inventors: Tyler Miller, Denver, CO (US); John M. Bacus, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 471 days.

(21) Appl. No.: 13/676,338

(22) Filed: Nov. 14, 2012

(65) Prior Publication Data

US 2013/0120369 A1 May 16, 2013

Related U.S. Application Data

(60) Provisional application No. 61/560,088, filed on Nov. 15, 2011.

(51) Int. Cl.
| | |
|---|---|
| G06T 15/00 | (2011.01) |
| G06T 17/00 | (2006.01) |
| G06T 19/20 | (2011.01) |
| G06F 21/62 | (2013.01) |
| G06F 21/16 | (2013.01) |
| G06F 9/44 | (2006.01) |

(52) U.S. Cl.
CPC .......... *G06T 17/00* (2013.01); *G06F 21/16* (2013.01); *G06F 21/6227* (2013.01); *G06T 19/20* (2013.01); *G06F 8/71* (2013.01); *G06F 2221/0791* (2013.01); *G06F 2221/2145* (2013.01); *G06T 2201/0064* (2013.01)

(58) Field of Classification Search
CPC ......... G06F 21/10–21/16; G06T 17/00–17/30; G06T 19/20
See application file for complete search history.

(56) References Cited

U.S. PATENT DOCUMENTS

| | | | |
|---|---|---|---|
| 6,158,903 A | 12/2000 | Schaeffer et al. | |
| 7,092,907 B2 * | 8/2006 | Kanevsky et al. | 705/51 |

(Continued)

FOREIGN PATENT DOCUMENTS

| | | |
|---|---|---|
| EP | 1004068 | 5/2000 |
| EP | 2352120 | 8/2011 |

(Continued)

OTHER PUBLICATIONS

Ohbuchi et al., Watermarking Three-Dimensional Polygonal Models, Proceedings of the Fifth ACRM Internal Conference on Multimedia, 1997, pp. 261-272.*

(Continued)

*Primary Examiner* — Charles Tseng
(74) *Attorney, Agent, or Firm* — Sheridan Ross P.C.

(57) ABSTRACT

A first user having a certain set of privileges with respect to an initial three-dimensional (3D) model associates a watermark with the initial 3D model, so that the watermark is displayed whenever the initial 3D model is viewed or edited. A second user having a smaller set of privileges with respect to the initial 3D model is permitted to view, copy and/or modify the initial 3D model, but is not permitted to remove or alter the content of the watermark. The watermark is continuously displayed as the second user works with the initial 3D model. When the second user applies a change to the initial 3D model, an indication of the modifications applied by the second user is generated and stored with the model data corresponding to the updated 3D model.

28 Claims, 4 Drawing Sheets

(56) References Cited

U.S. PATENT DOCUMENTS

| | | | |
|---|---|---|---|
| 7,139,444 B2* | 11/2006 | Ameline et al. | 382/305 |
| 7,200,639 B1 | 4/2007 | Yoshida | |
| 7,516,132 B1 | 4/2009 | Fast et al. | |
| 7,917,584 B2 | 3/2011 | Arthursson | |
| 2002/0069215 A1 | 6/2002 | Orbanes et al. | |
| 2002/0154144 A1 | 10/2002 | Lofgren et al. | |
| 2003/0021439 A1 | 1/2003 | Lubin et al. | |
| 2003/0135557 A1 | 7/2003 | Davis | |
| 2004/0153824 A1 | 8/2004 | Devarajan et al. | |
| 2004/0239679 A1 | 12/2004 | Ito et al. | |
| 2005/0131659 A1 | 6/2005 | Mei et al. | |
| 2005/0165859 A1* | 7/2005 | Geyer et al. | 707/201 |
| 2005/0171790 A1 | 8/2005 | Blackmon | |
| 2006/0066609 A1* | 3/2006 | Iodice et al. | 345/419 |
| 2006/0119601 A1 | 6/2006 | Finlayson et al. | |
| 2006/0250418 A1 | 11/2006 | Chartier et al. | |
| 2007/0174027 A1 | 7/2007 | Moiseyev | |
| 2008/0028323 A1 | 1/2008 | Rosen et al. | |
| 2008/0046828 A1 | 2/2008 | Bibliowicz et al. | |
| 2008/0140732 A1 | 6/2008 | Wilson et al. | |
| 2008/0141334 A1 | 6/2008 | Wicker et al. | |
| 2008/0229234 A1 | 9/2008 | Astolfi et al. | |
| 2009/0077119 A1 | 3/2009 | Speth et al. | |
| 2009/0141023 A1 | 6/2009 | Shuster | |
| 2009/0237411 A1 | 9/2009 | Gossweiler et al. | |
| 2010/0013842 A1 | 1/2010 | Green et al. | |
| 2010/0017461 A1 | 1/2010 | Kokkevis et al. | |
| 2010/0045662 A1 | 2/2010 | Boothroyd et al. | |
| 2010/0118039 A1 | 5/2010 | Labour | |
| 2010/0146085 A1 | 6/2010 | Van Wie et al. | |
| 2010/0198563 A1 | 8/2010 | Plewe | |
| 2011/0025688 A1 | 2/2011 | Schneider et al. | |
| 2011/0153368 A1 | 6/2011 | Pierre et al. | |
| 2011/0169826 A1 | 7/2011 | Elsberg et al. | |
| 2012/0054261 A1 | 3/2012 | Evans et al. | |
| 2012/0109591 A1 | 5/2012 | Thompson et al. | |
| 2012/0117145 A1 | 5/2012 | Clift et al. | |
| 2012/0331061 A1 | 12/2012 | Lininger | |
| 2013/0120367 A1 | 5/2013 | Miller et al. | |
| 2013/0120368 A1 | 5/2013 | Miller et al. | |
| 2013/0132466 A1 | 5/2013 | Miller et al. | |
| 2013/0144566 A1 | 6/2013 | De Biswas | |
| 2014/0033265 A1* | 1/2014 | Leeds et al. | 726/1 |

FOREIGN PATENT DOCUMENTS

| | | |
|---|---|---|
| JP | 2001-229401 | 8/2001 |
| JP | 2003-099805 | 4/2003 |
| JP | 2005-269280 | 9/2005 |
| WO | WO 2008/041061 | 4/2008 |

OTHER PUBLICATIONS

Sohn et al., User Transparent 3D Watermarking System Based on Security Policy, International Conference on Cyberworlds, Oct. 2007, pp. 89-92.*

Koller et al., Research Challenges for Digital Archives of 3D Cultural Heritage Models, ACM Journal on Computing and Cultural Heritage, vol. 2, No. 3, Article 7, Dec. 2009.*

International Search Report and Written Opinion for International (PCT) Patent Application No. PCT/US2012/064940, mailed Mar. 26, 2013 9 pages.

International Search Report for International (PCT) Patent Application No. PCT/US2012/064926, mailed Mar. 29, 2013 3 pages.

International Preliminary Report on Patentability for International (PCT) Patent Application No. PCT/US2012/064926, mailed May 30, 2014 6 pages.

International Search Report and Written Opinion for International (PCT) Patent Application No. PCT/US2012/064931, mailed Mar. 13, 2013 9 pages.

International Preliminary Report on Patentability for International (PCT) Patent Application No. PCT/US2012/064931, mailed Jun. 5, 2014 6 pages.

International Search Report and Written Opinion for International (PCT) Patent Application No. PCT/US2012/064932, mailed Mar. 22, 2013 11 pages.

International Preliminary Report on Patentability for International (PCT) Patent Application No. PCT/US2012/064932, mailed May 30, 2014 8 pages.

International Preliminary Report on Patentability for Intenational (PCT) Patent Application No. PCT?US2012/064940, mailed May 30, 2014 8 pages.

International Search Report and Written Opinion for Application No. PCT/US2012/044297, dated Dec. 27, 2012.

International Preliminary Report on Patentability for International (PCT) Patent Application No. PCT/US2012/044297, mailed Jan. 16, 2014 8 pages.

Official Action for U.S. Appl. No. 13/159,705, mailed Jul. 16, 2013.
Official Action for U.S. Appl. No. 13/159,705, mailed Mar. 20, 2014.
Official Action for U.S. Appl. No. 13/676,323, mailed Mar. 24, 2015 63 pages.
Official Action for U.S. Appl. No. 13/676,340, mailed Jan. 6, 2015 20 pages.
Official Action for U.S. Appl. No. 13/676,330, mailed Nov. 19, 2014 28 pages.
Official Action for U.S. Appl. No. 13/169,705, mailed Oct. 21, 2014 12 pages.
Extended Search Report for European Patent Application No. 12850450.3, dated Jul. 15, 2015 8 pages.
Official Action for U.S. Appl. No. 13/676,323, mailed Sep. 16, 2015 76 pages.
Official Action for U.S. Appl. No. 13/676,340, mailed Aug. 12, 2015 28 pages.
Notice of Allowance for U.S. Appl. No. 13/676,330, mailed Aug. 10, 2015 8 pages.
Notice of Allowance for U.S. Appl. No. 13/169,705, mailed Sep. 1, 2015 7 pages.

* cited by examiner

CONTROLLING RIGHTS TO A DRAWING IN A THREE-DIMENSIONAL MODELING ENVIRONMENT

CROSS REFERENCE TO RELATED APPLICATIONS

This application claims the benefit of U.S. Provisional Patent Application No. 61/560,088, filed on Nov. 15, 2011, entitled "Controlling Rights to a Drawing in a Three-Dimensional Modeling Environment," the disclosure of which is hereby expressly incorporated herein by reference.

FIELD OF THE DISCLOSURE

This disclosure relates to developing a three-dimensional (3D) model of an object or a group of objects and, in particular, to controlling rights to a drawing or to a portion of a drawing in a 3D modeling environment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, professional as well as non-professional users in a variety of different fields, such as engineering, architecture, automotive design, graphic design, advertising, fashion design, medicine, etc., can develop three-dimensional (3D) models of buildings, vehicles, and other objects using 3D modeling software that operates on a computing device. A user typically interacts with 3D modeling software via input devices such as a keyboard, mouse, trackball, and/or stylus, and the drafting document is displayed on a graphical display device, such as a computer monitor or screen.

In general, 3D modeling software allows a user to draw various three-dimensional shapes (directly or by defining two-dimensional (2D) faces that make up 3D shapes), apply colors and/or textures to the shapes, move, scale, rotate, and skew the shapes, etc. 3D software typically provides the user with stock shapes (e.g., 3D shapes such as spheres or parallelepipeds and/or two-2D shapes such as arcs, circles, rectangles, and other known geometric shapes) and/or provides tools to create such shapes. Further, 3D modeling software typically allows users to save models as files that conform to a certain predefined format. To share models, users transmit to each other files with the corresponding model data, or upload the files to data servers.

Users usually develop 3D models by sequentially entering various drawing and image manipulation commands via a graphical user interface (GUI). For example, to model a two-story building, a user may first draw a four-wall structure, draw a door in one of the walls, then draw several windows in the walls, etc. The user may then paint or texture the walls, the roof, and other portions of the model. Accordingly, it may take a significant amount of time and creativity for a single user to develop a complex and detailed model, and a user may desire to retain and control rights to access his or her developed model.

SUMMARY

In an embodiment, a method of controlling rights to three-dimensional models may include generating a first association between a first watermark and initial model data. The first watermark may correspond to a first owning party, and the initial model data may correspond to an initial three-dimensional (3D) model. Parties other than the first owning party may be prevented from modifying the first association unless permission or authorization to do so has been granted by the first owning party.

The method may include receiving a user-initiated command from a second user to modify a portion of the initial 3D model. The second user may have a smaller set of access rights or privileges to the initial 3D model than the owning party. Based on the user-initiated command from the second user, a respective portion of the initial model data may be modified to form updated model data corresponding to an updated 3D model. The method may include generating a second association between a second watermark and the updated model data, where the second watermark corresponds to the second user. The updated 3D model may be rendered at a display in conjunction with a rendering of the first watermark and a rendering of the second watermark.

In another embodiment, a system for controlling rights to three-dimensional model data includes a memory that stores initial model data corresponding to a three-dimensional model and that stores an indication of a first association between a first user and the three-dimensional (3D) model. The system may include tangibly stored computer-executable instructions executable by a processor to receive a user-initiated command from a second user to modify a portion of the initial 3D model, and to apply a change, in accordance with the user-initiated command, to the initial model data to form updated model data corresponding to an updated 3D model. The computer-executable instructions may be further executable to store an indication of a second association between the second user and the changes generated by the second user. The computer-executable instructions may be further executable to cause a rendering, on a display device, of a first watermark corresponding to the first association and a second watermark corresponding to the second association in conjunction with a rendering of the updated 3D model. The computer-executable instructions may be executable to prevent the second user from altering the association of the first watermark with the updated 3D model.

In yet another embodiment, a non-transitory, tangible computer-readable medium includes computer-executable instructions stored thereon and executable to receive a request from a user to view an initial three-dimensional (3D) model and cause the initial three-dimensional (3D) model and a corresponding first watermark to be displayed. The computer-readable medium may include further instructions stored thereon and executable to receive an additional request from the user to modify the initial 3D model and apply a change, corresponding to the second request, to initial model data corresponding to the initial 3D model to generate updated model data corresponding to an updated 3D model. The computer-readable medium may include further instructions stored thereon and executable to store an indication of an association between an indication of a second watermark corresponding to the user, an indication of the first watermark, and the updated model data.

DETAILED DESCRIPTION

In embodiments described below, a three-dimensional (3D) development system including rights control permits users to use client devices operating on a local area network (LAN) or a wide area network (WAN) to develop models of various objects such as, for example, buildings, vehicles, and items of furniture. The techniques described herein, however, apply equally in environments and scenarios where client devices are not networked, e.g., when a first user develops a model on a first client device, and model data corresponding to the model is accessed by a second user, either at the first client device or at a second client device that is not networked to the first client device.

The client devices, which may be personal computers (PCs), may include 3D modeling software which the users operate to create and edit 3D models or components of the models. The 3D modeling software includes built-in functionality that allows a user to obtain credit for and secure access rights to a particular 3D model, or, in some embodiments, to a portion of the particular 3D model. An indication of the credit or the secured rights (e.g., a watermark or other marking) may be displayed whenever a rendering of the particular 3D model is displayed, and the watermark or marking continues to be displayed with the rendering of the particular 3D model, even if other users edit or create copies of the particular 3D model. Typically, only the creator or other authorized party may change the access rights to the particular 3D model, based on the credit of the particular 3D model to the creator or other authorized party.

In some embodiments, the 3D modeling software includes functionality that allows users to attach both visual and non-visual indications of the secured rights or contributor's credits to a 3D model. The type of an indication being attached to a 3D model may depend on the type or level of contribution. For example, in an embodiment, the creator or other authorized party is permitted to assign a visual indication such as a watermark to a certain 3D model, whereas another user who subsequently contributes a component to the 3D model or modifies an existing component of the 3D model is permitted to attach his or her name to the added or modified component as a non-visual indication (e.g., in the form of metadata corresponding to the component). Unlike a watermark, the name or other data attached to the added or modified component may not be automatically displayed whenever a rendering of the particular 3D model is displayed. However, according to an embodiment, the name is displayed in response to a user command. For example, the 3D modeling software may display a control such a button for viewing the creation and/or modification history of a component or the entire 3D model.

Further, in some embodiments, the 3D modeling software automatically attaches watermarks (or other visual indications) to 3D models in accordance with the type or level of user's subscription to the 3D modeling software. For example, when a user develops a 3D model using a trial version of the 3D modeling software, the user may have been granted a limited or restricted set of rights to use or access the modeling functions provided by the 3D modeling software. As such, a watermark with the text "trial version" or similar indication may be automatically attached to the 3D model, and the user may be prevented from removing the "trial version" watermark until the subscription type changes to an enhanced or full subscription (e.g., respectively, a subscription that grants a larger set of rights than the trial version or a subscription that grants unrestricted rights). Upon changing the subscription to an enhanced or full subscription, the "trial version" watermark and the 3D model may be disassociated, so that the "trial version" watermark is no longer displayed with the rendering of the 3D model. Still further, in an embodiment, the 3D modeling software attaches different watermarks (e.g., "trial version," "for educational use only," etc.) for different types of subscriptions.

Next, an example communication system in which techniques for 3D modeling including credit and/or rights control can be applied is discussed with reference to FIG. 1. By way of example, model development techniques are discussed below in relation to three-dimensional (3D) models such as those used by architects, engineers, and hobbyists. However, these or similar techniques also may be applied to two-dimensional (2D) drawings and other types of data.

Figure 1:
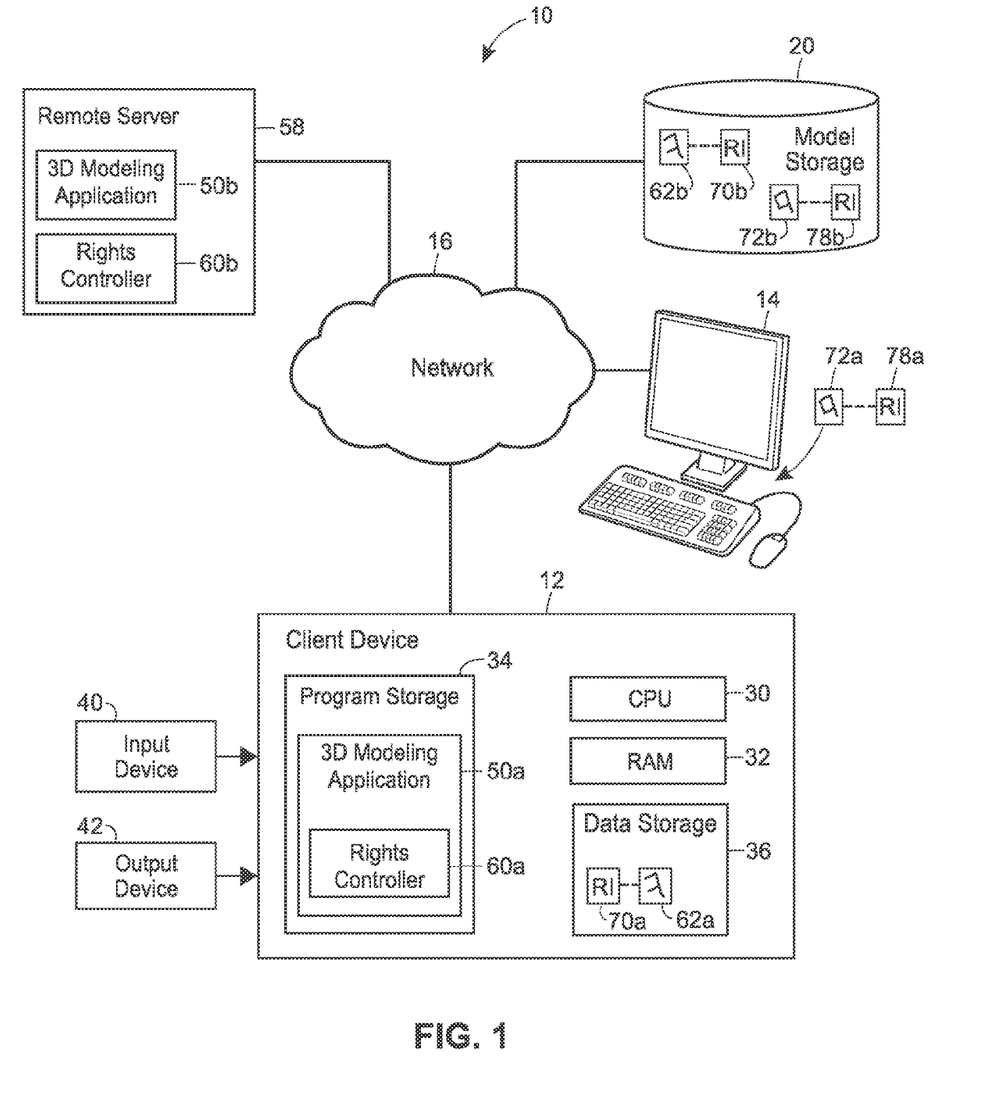
FIG. 1 is a block diagram of a communication system in which techniques of the present disclosure are utilized to allow a user operating a client device to develop a three-dimensional (3D) model of an object or a group of objects.

Referring to FIG. 1, in an embodiment, a communication system 10 includes a client device 12. In some embodiments, the system 10 may include another client device 14 that operates independently of the client device 12, and a communication network 16 to which the client devices 12 and 14 are communicatively coupled. Although the client devices 12 and 14 include similar hardware, software, and/or firmware components, for ease of illustration, the components of only the client device 12 are shown in FIG. 1. In operation, a user operating the client device 12 or the client device 14 develops a three-dimensional (3D) model of an object or a group of objects. In some embodiments, a first user at the client device 12 and a second user at the client device 14 may jointly develop a three-dimensional model. In an example, the first and second users collaboratively (e.g., substantially at the same time) develop a 3D model via the network 16. In another example, the first user develops a model, and a second user uses the model developed by the first user as a template for developing a new model at a later, independent time. In some embodiments, the communication system 10 includes a model database or storage 20 to store model data corresponding to various 3D models.

The network 16 may be a public network, such as the Internet, or the network 16 may be a private network, such as a firewalled local LAN (Local Area Network) or VPN (Virtual Private Network). In some embodiments, the network 16 may be a combination of one or more private networks and one or more public networks. The network 16 may utilize one or more known networking technologies, such as client-server, peer-to-peer, cloud computing, or any other known networking technologies. The network 16 may be a wired network, a wireless network, or a combination of one or more wired and wireless networks.

The client device 12, in some embodiments, includes a central processing unit (CPU) 30 to execute computer-readable instructions, a random access memory (RAM) unit 32 to store data and instructions during operation, program storage 34 including persistent memory to store software applications, shared software components such as Dynamic-link Libraries (DLLs), and other programs executed by the CPU 30, and data storage 36 including persistent memory to store data used by the programs stored in the program storage 34. By way of example, the program storage 34 and the data storage 36 may be implemented on a hard disk drive (HDD) coupled to the CPU 30 via a bus. Generally, the program storage 34 and the data storage 36 may be implemented on one or more non-transitory, computer-readable mediums. In fact, the components 30, 32, 34, and 36 may be implemented in any suitable manner.

In the example implementation of FIG. 1, the client device 12 is a personal computer (PC). However, in general, the client device 12 may be any suitable stationary or portable computing device such as a tablet PC, a smartphone, etc. Although the computing device 12 in the example of FIG. 1 includes both storage and processing components, the client device 12 in other embodiments can be a so-called thin client that depends on another computing device for certain computing and/or storage functions. For example, in one such embodiment, the data storage 36 and the program storage 34 are external to the computing device 12 and are connected to the client device 12 via a network link. Further, the client device 12 may be coupled to an input device 40 and an output device 42. The input device 40 may include, for example, a pointing device such as a mouse, a keyboard, a touch screen, a trackball device, a digitizing tablet, or a microphone, and the output device 42 may include an LCD display monitor, a touch screen, or another suitable output device. Using the input device 40 and the output device 42, a user can access a user interface of the client device 12, such as a graphical user interface (GUI).

The model storage device 20 of the system 10 may be accessed by the client device 12 via the network 16, as illustrated in FIG. 1. In some embodiments, however, the model storage device 20 may be at least partially included in local data storage 36 of one or more client devices 12, 14. The model storage device 20 may include one or more physical data storage devices that are networked and are externally perceived as a single logical data storage device (e.g., a data bank, a multiple disk or other mass storage system, cloud data storage, or any other known data storage technology).

With continued reference to FIG. 1, the program storage 34 of the client device 12 may store a 3D modeling application 50a for developing 3D models of various objects. The 3D modeling application 50a includes a set of compiled, computer-executable instructions that are executable by the CPU 30 and that are stored in program storage 34, according to some embodiments. In one such embodiment, the 3D modeling application 50a is a stand-alone application independently executable by the CPU 30. In another embodiment, the 3D modeling application 50a is provided as a component (e.g., a plugin) that extends the functionality of another software application such as a web browser, for example. In still other embodiments, the 3D modeling application 50a includes a set of instructions in a scripting language that are interpretable by another application, such as a web browser, at runtime. Generally speaking, the 3D modeling application 50a provides a set of modeling controls to generate, position, and variously adjust three-dimensional shapes, apply textures to the shapes or surfaces, define interactions between shapes, etc. Models developed using the 3D modeling software 50a may be stored on a non-transitory, tangible computer-readable medium, such as the data storage 36, as data files including model data that conforms to a certain non-image format. For example, the non-image format may specify a set of faces of a 3D model along with the corresponding attributes, such as the position and orientation of a face, the texture of the face, etc. In an embodiment, the model data may include an indication of an author of the model. Further, model data may include a hierarchical tree data structure with branches on two or more levels describing respective components. An example tree data structure that may be used to store model data is discussed in more detail with reference to FIG. 3.

In some embodiments, rather than the 3D modeling application 50a locally providing a set of modeling operations or commands at the client device 12, the local 3D modeling application 50a instead provides access to a 3D modeling application 50b, such as on a website server, web site hosting location, computing cloud, or other type of server 58. In these embodiments, the local 3D modeling application 50a and the remote 3D modeling application 50b collaborate to provide the set of modeling operation or commands. For example, the local 3D modeling application 50a may enable a user of the device 12 to access modeling commands provided by the remote 3D modeling application 50b via a web browser, an API (Application Program Interface), or other type of remote access application. In some embodiments, the local 3D modeling application 50a may be downloaded from the server 58. As used herein, for clarity, the term "3D modeling application 50" is used to denote the 3D modeling functionality provided by embodiments where the 3D modeling application 50a is used in a stand-alone mode at the client device 12, and/or embodiments where the 3D modeling application 50a operates in conjunction with the remote 3D modeling application 50b.

The data storage 36 and the model storage 20 may store respective copies of model data 62a, 62b, each of which describes a same 3D model. In some embodiments, the client device 12 obtains a local copy 62a of "master" copy of the model data 62b and stores it locally in the storage 36. In an example, a library of master or template models including the model data 62b may be stored in a centralized location 20, and a user at the client device 12 may obtain and store a local copy 62a of one or more desired templates to use as a basis for developing a new model. The resulting new model may be stored only locally at the client device 12, or the user may choose to add the new model to the library at the storage device 20 for access by others.

In another example, different users at different respective client devices 12, 14 may simultaneously (or essentially simultaneously) develop a same model via the network 16. In this example, the "master copy" stored at the centralized location 20 may collect collaborative updates from both client devices 12, 14 during the development process of the same model. The client device 12 may exchange real-time or periodic updates describing modifications to the master copy 62b of model data corresponding to the same model, so that the 3D modeling application 50 executing on the client device can appropriately update the local copy of the model data 62a and the client device 14 may do the same.

In any event, as model data 62a and model data 62b are copies of each other, in an embodiment, the term "model data 62" as used herein refers to the model data corresponding to the model 100, whether in model data 62a, model data 62b, or both.

In an embodiment, the 3D modeling application 50a is in communication with a rights controller 60a. The rights controller 60a may be a routine or set of computer-executable instructions that are executable by the CPU 30, stored in program storage 34, and are for controlling rights to three-dimensional model data. In FIG. 1, the rights controller 60a is illustrated as included in the 3D modeling application 50a at the client device 12, but other configurations are possible. For example, the rights controller 60b may be another application separate from but in communication with the 3D modeling application 50b, such as illustrated at the remote server 58. Other configurations may be possible. For example, the rights controller 60b may be remotely located only at the remote server 58, and may communicate with all client devices 12, 14 in the system 10. In other embodiments, the rights controller 60b may be included in the 3D modeling application 50b at the remote server 58, and the rights controller 60a may be separate from the 3D modeling application 50a at a client device 12. As used herein, for clarity, the term "rights controller 60" is used to generally refer to the rights controller 60a, the rights controller 60b, or both rights controllers 60a and 60b. Generally, the rights controller 60 is configured to manage rights of access to models, and to permit or deny access to models based on the rights, in an embodiment.

In an embodiment, the rights controller 60 allows access by a requesting party to a particular set of 3D model data in accordance with the rights, levels of access, or set of access privileges of the requesting party. Rights, levels of access and/or sets of access privileges may include, for example, permission to view the 3D model data, to copy the 3D model data, to export the 3D model data, and/or to modify the 3D model data (e.g., add a new portion and/or delete a selected portion of the 3D model data to form updated model data). Certain specific parties or groups may be permitted or allowed, by the rights controller 60, to access the particular 3D model data. For example, access to a particular set of 3D model data may be granted to its originator or creator, to an individual or corporate owner of the particular model, a paid subscriber, a licensee, or other party to whom rights have been granted or conferred (referred to herein as "an owning party"). In some embodiments, more than one owning party may have rights to access the particular 3D model data, such as a group of employees whose company has licensed the use a set of models from the originator. In some embodiments, different users or groups of users may have different levels of access or different access privileges to a particular set of 3D model data. Access to the 3D model data may include, for example, one or more of viewing, copying, exporting, or modifying the particular set of 3D model data.

In addition to managing access to model data, the rights controller 60 may manage rights to the model data. The rights controller 60 may manage, for example, the creation, deletion and/or modification of the rights of different parties to different sets of model data. For example, if the owning party desires to add authorized users to view, copy, export or modify the particular 3D model data, he or she may enter these rights via the user interface 40, and the rights controller 60 may process and store the desired authorizations. In an embodiment, indications of rights to a particular set of model data may be stored with metadata that corresponds to the particular set of model data. The particular set of model data may correspond to a particular 3D model, or may correspond to one or more particular components of the particular 3D model. The rights controller 60 has read/write access to the metadata, in an embodiment.

In some embodiments, the rights controller 60 may manage the application, deletion and maintenance of a marking that indicates the rights to a particular 3D model. The marking may be visually perceived on a display, e.g., a watermark, and/or the marking may be a non-visual indication whose details may be viewable upon user request. For example, when a user clicks on a display control, the rights information corresponding to the non-visual indication may be displayed in the background or in a pop-up window. The marking, whether visual or non-visual, may correspond to the owning party or contributing party of the particular 3D model, and may be associated with a rendering of the particular 3D model to indicate the rights of the owning party or contributing party to the particular 3D model. In some embodiments, a visual marking such as a watermark may be defined or otherwise selected by an owning party. In some embodiments, contents of the marking may be modified by an owning party (e.g., "First Draft," "Second Draft," etc.). The marking, whether visual or non-visual, may include pictorial information, text, or a combination of pictorial and textual information. The marking may indicate a trademark or a copyright, in some embodiments. The rights controller 60 may maintain or access the associations between markings and owning or contributing parties, in an embodiment.

Figure 2:
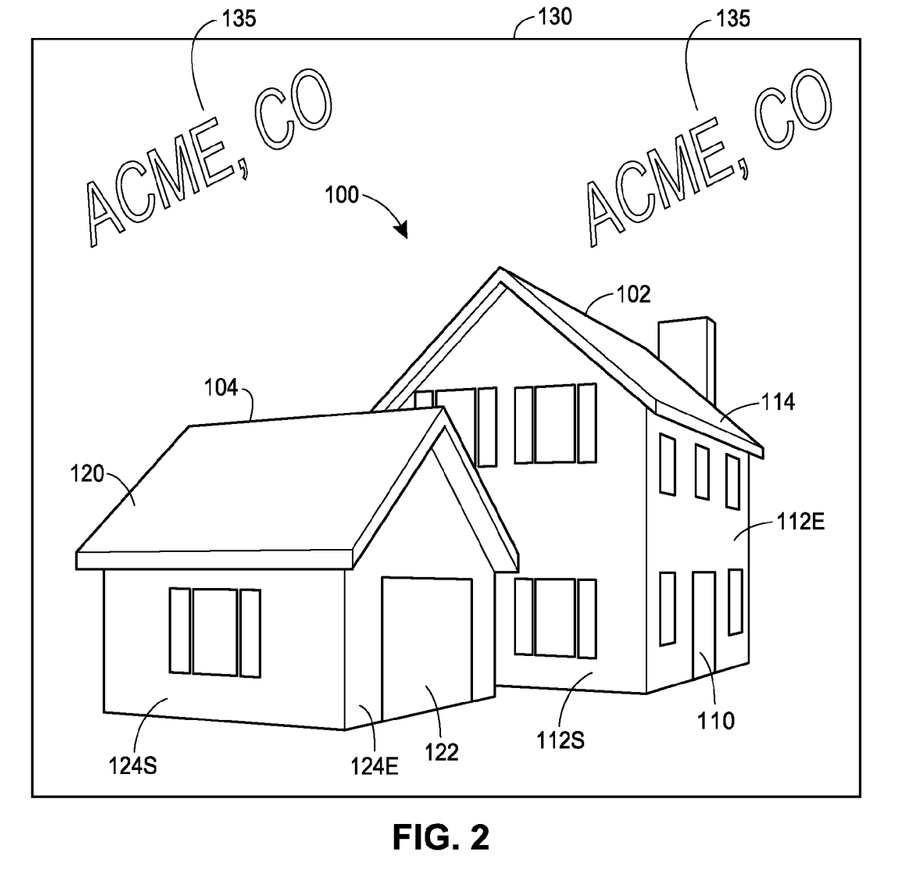
FIG. 2 is a rendering of an example model stored in the communication system of FIG. 1, including a rendering of an indication of rights to the model.

To consider an example scenario of controlling rights to a drawing in 3D modeling environment with reference to FIGS. 1-4, user Taylor operating the client device 12 develops a 3D model such a model 100 illustrated in FIG. 2. For example, Taylor may enter commands at the user interface 40 of the client device 12, and the 3D model application 50 may operate in accordance with the entered commands to generate the model 100. As can be seen in FIG. 2, the model 100 includes a house component 102 and a garage component 104. Each of the components 102 and 104 in turn may include several sub-components. For example, the house component 102 includes a door 110, walls including a southern wall 112S and an eastern wall 112E visible in FIG. 2, and a roof 114, while the garage component 104 includes a roof 120, a door 122, and walls including a southern wall 112S and an eastern wall 112E visible in FIG. 2. As also can be seen in FIG. 2, the model 100 may include other components such as windows and a chimney, for example, the discussion of which is omitted for ease of illustration. According to one embodiment, each of the components illustrated in FIG. 2 is made up of one or more elements such as 3D geographic shapes: cuboids, spheres, pyramids, etc. In another embodiment, the components of FIG. 2 may be generated using groups of two-dimensional faces: squares, circles, triangles, etc.

According to one embodiment, the 3D modeling application 50 generates components of the model 100 according to commands received from user Taylor. For example, to draw the roof 120, Taylor may draw multiple shapes and group the shapes using the user interface of the 3D modeling application 50 (e.g., by selecting several shapes with a mouse and activating an icon for generating a group of selected shapes). In general, a model can have nested components at multiple levels. For example, Taylor may group several shapes to define a window frame component, then group the window frame component with several 3D shapes to define a window component, create several instances of the window component and group these several instances into a larger "multiple windows" component, etc. Further, in some embodiments, the 3D modeling application 50 may allows users such as Taylor to first define components as groups including multiple 3D shapes (and possibly other components) and then generate multiple instances of the defined component. When a user later edits an instance of a component, the changes are automatically applied to other instances of the component, according to an embodiment.

Figure 3:
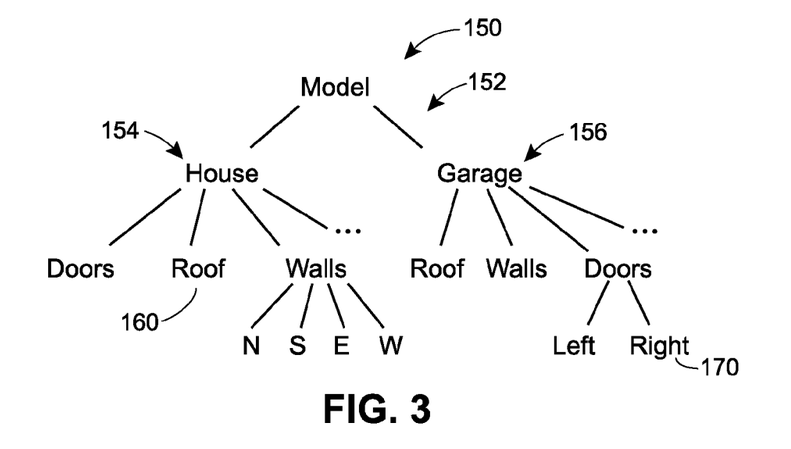
FIG. 3 is a diagram of an example data structure storing model data that describes the model of FIG. 2.

In various embodiments, users may be able to associate markings of ownership and/or contribution (whether visually displayed or not) to an entire 3D model or to one or more portions of a 3D model. To better illustrate the techniques of assigning, controlling and indicating rights of ownership and/or contribution to at least a portion of a drawing of a 3D model, an example technique for organizing model data corresponding to a 3D model is provided. FIG. 3 is a schematic diagram of an example data structure 150 corresponding to the model 100, which the 3D modeling application 50 may generate when user Taylor groups the shapes in the manner outlined above. After Taylor creates the model 100, the 3D modeling application 50 initially may store model data 62 including the data structure 150 in the data storage 36. The data structure 150 includes a root node 152, a house branch 154, and a garage branch 156. Each of the branches 152 and 156 stores a particular component of the model 100. Further, the house branch 154 includes a roof branch 160 that corresponds to the roof component 114 as well as other branches corresponding to other components (a doors component, a walls component, etc.). As can be seen in FIG. 3, the garage branch 156 includes, among other branches, a doors branch with a right-door branch 170 that corresponds to the component 122. The right-door branch 170 may specify the component 122 as a set of 3D shapes, texture and/or color information, animation data, and other data. In general, a component may include drawing data, non-drawing data (e.g., text labels, metadata), and other components that also may include drawing and non-drawing data. In addition to the data structure 150, the model data 62 may include other information (e.g., metadata) such timestamp information, user information, etc.

In an embodiment, the 3D modeling application 50 utilizes the data structure 150 to represent a selected component of the model 100 in a serialized format. Generally speaking, by generating a serialized representation a component branch, a device operating in a 3D modeling development environment permits another device, such as a client device or a server, to properly resolve conflicts and address collisions between modifications submitted at several devices using OT (operational transform) techniques. A serialized representation of a branch may include a sequence of basic 3D shapes (cuboids, spheres, etc.) that make up the corresponding component, in an embodiment.

As an additional example, development of a text document may be briefly considered and contrasted with development of a 3D model. If two users collaboratively edit version V of a string of text S, such as "This is modeling," modifications to the string can be easily expressed in terms of text editing commands (e.g., insert, delete, replace, etc.) applied at specific character positions within the string S. For example, a first user may wish to insert the world "collaborative" following the eighth byte of the string S according to version V, and a second user may replace the word "is" in fifth and sixth bytes of the same version of the string S with the word "was." If the command from the second user is applied to the string S first, the unmodified command from the second user is then applied to the wrong portion of the string S. However, the commands from the first user and the second user can be easily reconciled by modifying the index at which the new word is to be inserted (in this case, the index can be modified to indicate the ninth byte rather than the eighth byte). In fact, in the example above, regardless of the order in which the two uses submit modifications to the string S, the conflict between the two commands is easily resolved, if the version V to which the corresponding command is applied is known. Thus, modifications to documents in which data is represented linearly (e.g., text documents) or in terms of numbered cells (e.g., spreadsheets) can be concurrently performed using indexing relative to a known version of the document.

On the other hand, unlike text or spreadsheet data, the model 100 is not easily described in a linear manner. The 3D modeling application 50 may generate the data structure 150 to describe the model as a hierarchical tree structure and, when necessary, generate serialized descriptions of branches to report updates to other devices, for example. The 3D modeling application 50 may generate a unique component identifier for a branch in the data structure 150. In one embodiment, the 3D modeling application 50 generates a component identifier for a component at the time when a user defines the component. For example, once Taylor defines the garage component 104, the 3D modeling application 50 or 55 may generate a component identifier as a string of alphanumeric characters and store the generated component identifier as an attribute of the branch 156. In another embodiment, the 3D modeling application 50 generates a component identifier for a component in response to receiving an indication that a user wishes to edit the component. The component identifier in some embodiments is generated randomly. For example, the 3D modeling application 50 may generate the component identifier that conforms to a Globally Unique Identifier (GUID) format and as such is associated with a low probability of duplication. Further, the client device 12 may maintain a look-up table (e.g., a hash table) to quickly retrieve component identifiers for various components of the model 100.

Referring back to FIG. 1, after Taylor has finalized her model 100, Taylor may save the model 100 (for example, as model data 62). An indication that Taylor is the creator or author of the model 100 may also be saved, such as in metadata associated with the model data 62.

Additionally, Taylor may indicate, via the user input device 40, that she wishes to obtain credit for or secure rights to the entire model 100 or to some portion of the model 100. The rights controller 60 may receive the request via the user interface 40, 42 and, based on the request, may create and store indications 70a, 70b of an association between the model data 62a, 62b, respectively, and rights of the model data 62 to an owning party. (As indications 70a, 70b are copies of one another, in an embodiment, the term "rights indication 70" as used herein indicates one or both of indications 70a, 70b, for clarity's sake.) The owning party may be, for example, Taylor, Taylor's employer, or another party to which Taylor is obligated to assign rights of the models that she creates. The rights indication 70 may be stored in conjunction with the model data 62, or the rights indication 70 may be stored separately from the model data 62. In some embodiments, metadata corresponding to the model 100 may include or indicate the rights indication 70. The location in which the rights indication 70 is stored may be accessible to the rights controller 60 (e.g., the data storage 36 and/or the model storage 20).

A rendering of the model 100 may include, based on the rights indication 70, a watermark or other indicator 130 that is rendered in conjunction with the rendering of the model 100. An association between the rendering of the watermark and the owning party may be stored in a location that is accessible to the rights controller 60, for example, in the data storage 36 and/or the model storage 20. In some embodiments, the association between the rendering of the watermark and the owning party may be stored within the rights indicator 70 itself.

Turning back to FIG. 2, FIG. 2 illustrates the model 100 being displayed on a display 130 rendered at a display device (such as output device 42) in conjunction with a watermark 135 (in FIG. 2, "ACME, Co.") that indicates the owning party of the credit or rights to the model data 62 corresponding to the model 100. In FIG. 2, the watermark 135 appears in the background of the display 130 multiple times and is grayed-out, but other forms or appearances of watermarks or markings may be used in conjunction with the techniques described herein. For example, the watermark 135 may appear only a single time on the display 130, or the watermark may appear in a different location on the display 130.

For example, in some embodiments, the contents of the watermark 135 may be pictorial, such as a logo. In some embodiments, the contents of the watermark 135 may include text, e.g., "PROPRIETARY AND CONFIDENTIAL." In some embodiments, at least a portion of the watermark 135 may be user-defined or user-indicated, e.g., "DRAFT 1,"

"DRAFT 2," "APPROVED VERSION," etc. A viewer or user may be able to temporarily change the appearance of the watermark. For example, the watermark 135 may be hidden on the display 130, sent to the background, brought to the foreground, re-sized, etc. based on a user command.

In addition to the association of the model data 62 with the owning party of its credit and rights, the rights indicator 70 may also include indications of the rights of one or more other parties to access the model data 62. For example, the rights indicator 70 may indicate which non-owning parties are allowed to view, copy, export, and/or modify the model data 62. Rights of another party to the model data 62 may be defined or granted based on a user identity (such as a login or other user identifier), or based on a group to which the other party belongs. For example, all members of a first work group may have rights to copy the model data 62, while members of a second work group may not have rights to even view the model data 62 at all. Different users and/or groups may be accorded different levels of access or different sets of access privileges to the model data 62. In an embodiment, the owning party may define at least a portion of the rights of other parties to make changes to the model data 62, and the rights controller 60 may retain corresponding rights indicators in accordance with the owning party's definitions.

Referring back to FIG. 1, after the model 100 and the rights indicator 70 have been stored, another user Chris may wish to modify the 3D model 100 using the client device 12 or the client device 14. For example, Chris may wish to add a component to the model 100, delete a component, or modify a component. In an example scenario, at the client device 14, Chris may request, via a user interface, to copy the model data 62 that corresponds to the model 100. The rights controller 60 may determine, based on the rights indicator 70, whether or not Chris has an appropriate level of access (e.g., if Chris has the appropriate rights) to view, copy, export, and/or modify the model data 62. If Chris does not have the appropriate level of access commensurate with his request, his request is denied.

If Chris has rights to copy the model data 62, his request is granted. Per Chris's granted request, a local copy 72a of the model data 62 may be stored at the client device 14 and/or a corresponding remote copy 72b may be stored at the model storage 20 (referred to generally herein as "copy 72" or "model data 72" for clarity purposes). Using the 3D modeling application 50, Chris may make modifications to the model data 72. For example, Chris may enter commands at the user interface 40 of the client device 14, and the 3D model application 50 that is accessible to the client device 14 may operate in accordance with the commands to apply Chris's changes to the copy 72 of the initial model data 62. While Chris works on the changes to the copy 72 of the initial model data 62, the watermark 135 may be continuously displayed to indicate the associated rights to the model 100 to which Chris's changes are applied.

In an embodiment, when the model data 62 or 72 is exported for use by another software application (such as an application for creating a multi-slide presentation), the watermark 135 is displayed along with the model 100. As discussed above, the watermark 135 may be displayed in the background or the foreground of the model 100, for example. Further, in an embodiment, when the model data 62 or 72 is printed or rasterized, the watermark 135 is automatically included in the print-out or the raster image.

Figure 4:
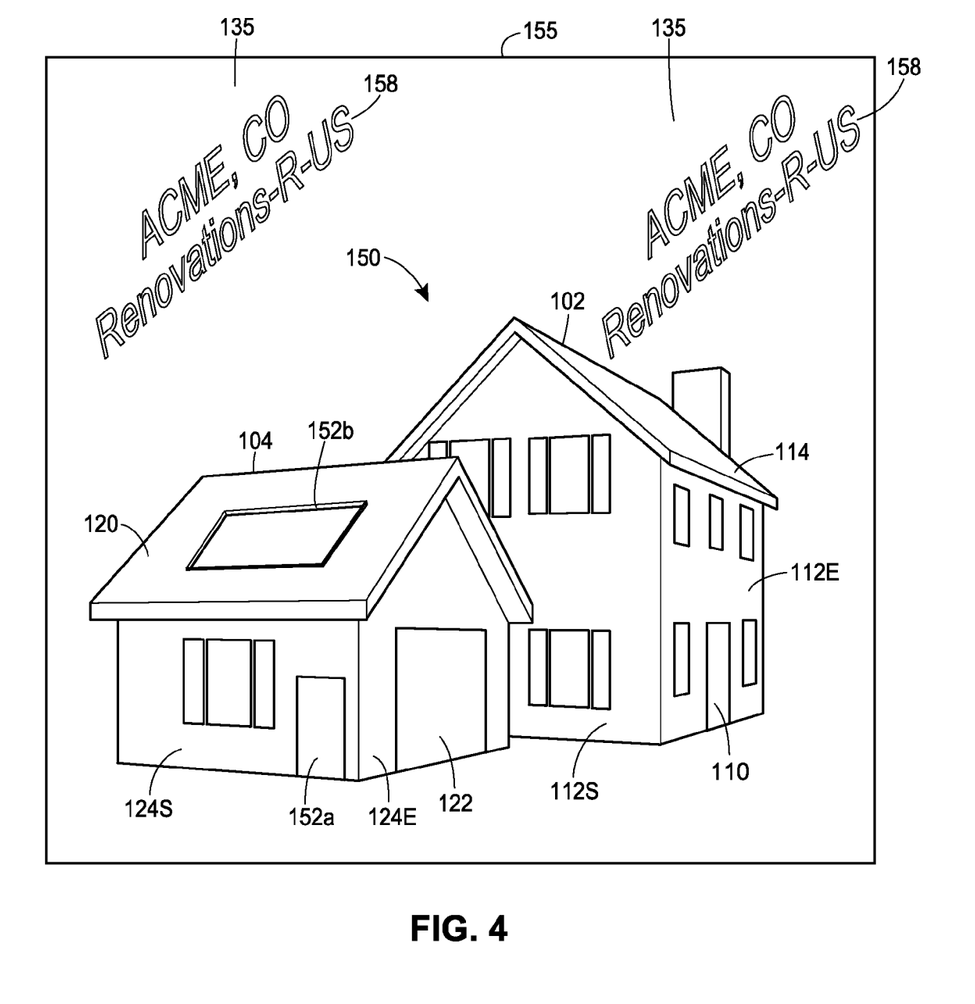
FIG. 4 is a rendering of an example model that is based on the model of FIG. 2 and generated by a different user in the communication system of FIG. 1.

FIG. 4 illustrates an example model 150 corresponding to the model data 72 generated by Chris. The model 150 is based on the model 100 and includes Chris's changes 152a, 152b. As the basis of the model 150 is the model 100, the watermark 135 corresponding to the model 100 (e.g., "ACME, Co.") is continuously rendered on the display 155 while Chris works on the model 150.

After Chris has finalized his model 150, Chris may save the model 150 (for example, as updated model data 72 in the local data storage of client device 14 and/or in the model storage 20). An indication identifying Chris as the creator or author of the changes 152a, 152b to the model 100 may also be saved, such as in metadata associated with the model data 72. In an embodiment, each metadata corresponding to each component to which Chris made a change may include an indication of the Chris as the owning party of the changes. Additionally or alternatively, an indication that Chris is a contributor to the model 150 and Taylor is a contributor to the model 150 may be saved in metadata associated with model data corresponding to a larger portion of or even the entire updated model 72.

Chris may indicate, via the user input device 40, that he wishes to obtain credit for or secure rights to the model 150. The rights controller 60 of client device 14 may receive the request from the user interface 40, 42 of the client device 14, and may create and store a indication of an association between the changes 152a, 152b (or model data corresponding thereto) attributable to Chris and rights to an owning party corresponding to Chris (e.g., to Chris, Chris's employer, or a party to which Chris is obligated to assign rights). For example, a local copy 78a of the rights indication to Chris may be created and stored, and/or a remote copy 78b of the rights indication to Chris may be created and stored (herein referred to generally as "rights indication 78" for clarity purposes). In an example, upon creation of the rights indication 78, a corresponding watermark 158 (e.g., in FIG. 4, "Renovations-R-Us") corresponding to the owning party of the changes 152a, 152b may be rendered on the display 155. In FIG. 4, the watermark 158 appears in the background of the display 155 multiple times and is grayed-out (similar to the watermark 135), but other forms or appearances may be used in conjunction with the techniques described herein. In some embodiments, the forms and appearances of the watermark 135 and the watermark 155 may differ. In another example, upon creation of the rights indication 78, a non-visual indication may be associated with the model 72, e.g., the indication that Chris is an owning party to the changes to the model 62 and/or a contributing party to the model 72 is included in metadata corresponding to the model 72 or in metadata corresponding to a respective component or other portion of the model 72.

The rights to the model data 62 corresponding to the model 100, however, remain with the first owning party corresponding to Taylor, and accordingly, the watermark 135 is rendered on the display 155 in conjunction with the model 150. Only rights to the deltas on top of model data 62 attributable to Chris (e.g., the differences between model data 62 and model data 72 corresponding to the changes 152a and 152b) may be associated with the owning party corresponding to Chris, and are thus stored in the rights indicator 78. In some embodiments, an indication of an association between the rights indicator 70 and the rights indicator 78 may be stored. For example, the rights indicator 78 corresponding to Chris's changes may include a reference to the rights indicator 70 corresponding to the base model data 62 on which Chris's changes were made. Thus, as the model 150 includes components having rights to multiple different owning parties, respective watermarks 135, 155 may be rendered in conjunction with the model 150 on the display 155, if both markings are desired to be visual and not non-visual.

Similar to the display 130 of FIG. 2, on the display 135 of FIG. 4, a viewer or user may be able to temporarily change the appearance of one or both watermarks 135, 155. For example, one or both watermarks may be hidden, sent to the background, brought to the foreground, re-sized, etc. However, while the rendering of the watermarks 135, 155 may be temporarily changed, only a user with appropriate authorization or permissions may permanently move or change the association of the watermark with its model within the system 10, e.g., the association of watermark 135 and model 100, or the association of watermark 158 and deltas 152a, 152b). For example, Taylor may have authorization to change the watermark corresponding to model 100 while Chris may not have authorization, as indicated in the rights indicator 70. Chris may have authorization to change the watermark corresponding to deltas 152a, 152b, and Taylor may or may not, depending on the contents of the rights indicator 78.

Note that in FIG. 4, the deltas or changes 152a, 152b are illustrated as additions of new portions or components to the model 100. In other embodiments, the deltas or changes made by Chris may include deletions of selected portions or components from the model 100, or may include other modifications to the model 100. For example, a change may be made to a characteristic of a component of the model 100 such as a change in length, width, size, orientation, location, etc. In some embodiments, combinations of one or more additions, one or more deletions, or one or more modifications may be included in the changes to form updated model 150.

Figure 5:
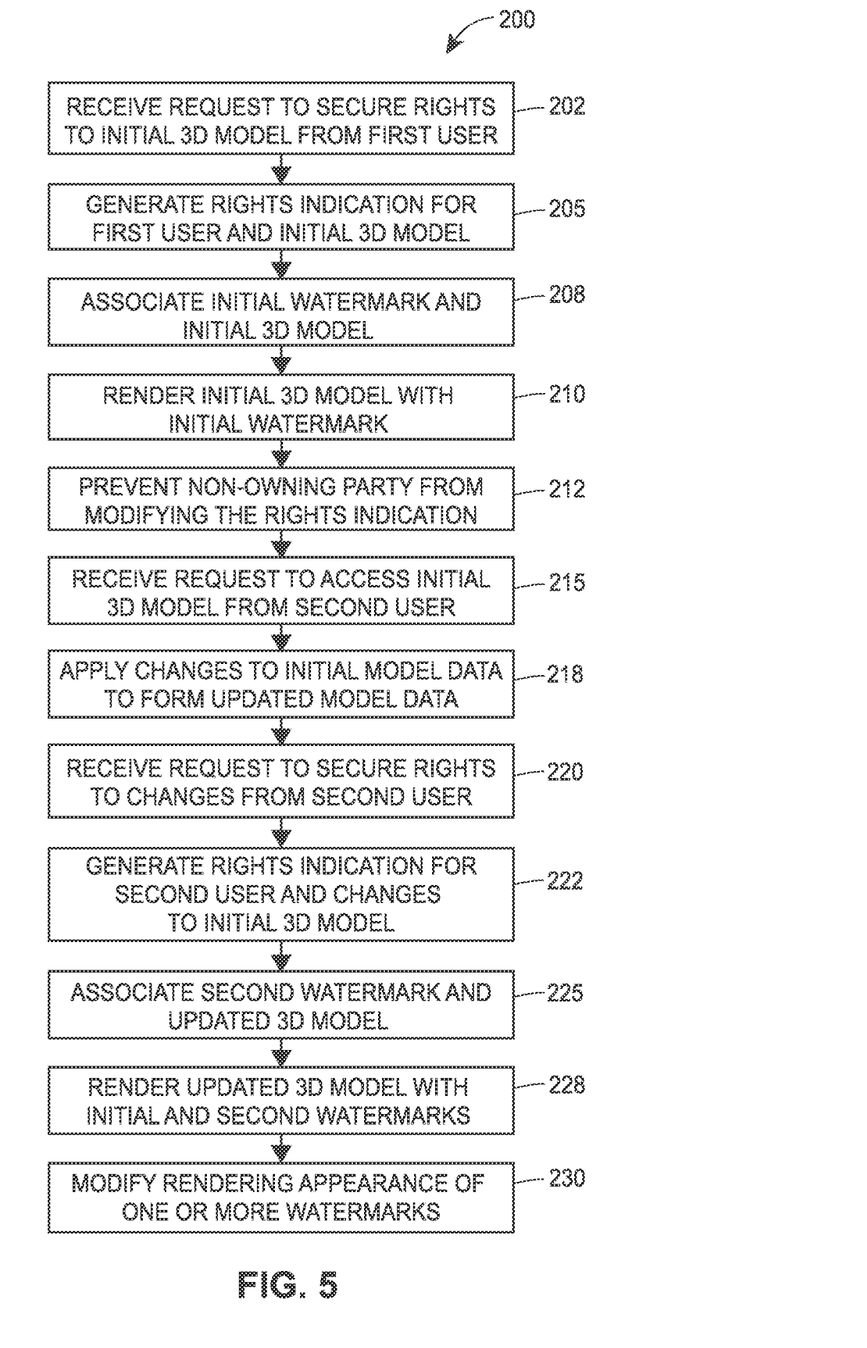
FIG. 5 is a flow diagram of an example method for controlling rights to three-dimensional models.

FIG. 5 illustrates an example method 200 for controlling rights to drawings of three-dimensional models in a three-dimensional modeling environment. In an embodiment, the techniques of FIG. 5 are implemented in the communication network of FIG. 1. However, it is noted that the techniques illustrated in FIG. 5 also can be used in other suitable environments.

The method 200 may be implemented by one or more computing devices participating in 3D modeling on a network, such as by client device 12, client device 14, and/or remote server 58 of FIG. 1. In some embodiments, at least a portion of the method 200 is implemented in a 3D modeling software such as the 3D modeling application 50. In some embodiments, at least a portion of the method 200 is implemented in a rights controller such as the rights controller 60. Depending on the embodiment, blocks of the method 200 may be distributed for execution between the modeling application 50 and the rights controller 60 in any suitable manner.

In general, embodiments of the method 200 of FIG. 5 may be implemented using any suitable programming language and may be stored as instructions on a non-transitory, tangible computer-readable medium. The instructions may execute on one or several processors, and may include compiled code, instructions interpreted by another software application (e.g., modeling software, a browser), or in any other suitable manner.

At block 202, a request from a first user to obtain credit for or secure rights to an initial three-dimensional model may be received. For example, the request may be received at a user interface of a computing device, or the request may be received (for example, at a web server) from a web-browser used by the first user. At block 205, a rights indication may be generated and stored based on the received request. The rights indication may indicate the rights of the first user to the initial model data corresponding to the initial 3D model. For example, the first user may be a creator or author of the initial 3D model, or may be some other owning party of the initial 3D model.

At a block 208, an association between an initial watermark and the initial 3D model data may be generated. For example, the association between the initial watermark and the initial 3D model may be generated based on rights indication generated at the block 205. The first watermark may be associated with the first user, and may be pre-defined or may be entered or selected by the first user. For example, the method 200 may include prompting the user to select the initial watermark and/or to enter information to be used in the initial watermark. The user may be associated with multiple watermarks, in some scenarios (e.g., "T. Smith; First Draft," "T. Smith; Second Draft," etc.). In some scenarios, the initial watermark may be associated with multiple users, in an embodiment (e.g., "ACME Co., Proprietary and Confidential"). In some embodiments, the association may be stored in local and/or remote memory. In some embodiments, the association between the initial watermark and the initial 3D model data may be stored with metadata corresponding to the initial model data and/or with data corresponding to the first user. The metadata corresponding to the initial model data may indicate the first user is a creator or originator of the initial model data.

At block 210, the initial 3D model may be rendered in conjunction with a rendering of the initial watermark. For example, the initial 3D model and the initial watermark are rendered together on a display in connection with a computing device. In an embodiment, the initial watermark is rendered in the background and the initial 3D model is rendered in the foreground. The initial 3D model may be rendered based on the initial 3D model data, and the watermark may represent a visual indication of the credit or rights of the first user to the initial 3D model.

At block 212, a non-owning party of the initial 3D model is prevented from modifying the rights indication of the first user and/or owning party and the initial 3D model. For example, if the non-owning party requests to modify the access permissions corresponding to the initial 3D model data, his or her request may be denied, or if a non-owning party requests to disassociate the initial watermark from the initial model data (or from any subsequent models created based on the initial model data), his or her request may be denied. If, however, when the first user or corresponding owning party grants permission for a particular non-owning party to access the initial model data (e.g., via a user-initiated command that is processed by the rights controller 60) the block 212 may be omitted for the particular non-owning party, but may be retained for other non-owning parties.

In an embodiment, the non-owning party is prevented from viewing, copying, and/or exporting the initial 3D model without the corresponding marking (e.g., watermark) being displayed in conjunction with the rendering of the initial 3D model. For example, if the non-owning party views the initial 3D model, the watermark or marking is displayed and the non-owning party is prevented from disassociating the watermark and the initial 3D model, and from disassociating their respective renderings (although, in some cases, the non-owning party may be permitted to temporarily hide and unhide the watermark on the display). Similarly, if the non-owning party copies the initial 3D model, the watermark or marking is rendered on the copy. The non-owning party is prevented from removing (e.g., disassociating) the watermark from the copy and from any models based on the copy, and from disassociating their respective renderings (although, in some cases, the non-owning party may be permitted to hide and unhide the watermark on the copy or on any models based on the copy).

In some embodiments, the non-owning party may be granted a level of access or privileges by the owning party, and the prevention of access to the initial 3D model (block 212) may be at least partly omitted with regard to the non-owning party. For example, if the non-owning party licenses usage of the initial 3D model from the owning party, pays for a usage subscription, or otherwise comes to an agreement with the owning party, the non-owning party may be granted some level of access to the initial 3D model, e.g., making up to N number of copies, unlimited copying for a length of time, permission to remove watermarks from renderings of models based on the initial 3D model, etc.

At a block 215, a user-initiated command to access the initial 3D model may be received, such as from a second user. For example, if the initial 3D model is stored in a library, a second user may enter a user-initiated command to copy and modify the initial 3D model. The user-initiated command may be received from the same or a different computing entity than the computing entity at which the initial 3D model was created, and/or may be received from the same or a different computing entity at which the rights to the initial 3D model were defined. In some embodiments, the user-initiated request may be received via a web browser or API.

In an embodiment, more than one user-initiated command may be received. For example, a first user-initiated command may be received to view the initial 3D model. If the second user has a level of access (e.g., a set of access privileges) to the initial 3D model that includes viewing privileges, the initial 3D model may be rendered in conjunction with the initial watermark, indicating the owning party's rights to the initial 3D model. A second user-initiated command may then be received to modify the initial 3D model.

At block 218, if the second user has an appropriate set of access privileges (e.g., has a level of access that includes copying and/or modification privileges) to modify the initial 3D model, the initial 3D model may be modified in accordance with the user-initiated modification command. For example, an indication of the user-initiated modification command may be processed by the 3D modeling application 50, and the initial 3D model data may be modified to form updated 3D model data corresponding to an updated 3D model. The modification may include applying one or more changes to the initial model data. Changes may include additions, deletions, or other modifications to the initial model data. For example, one or more components may be added to the initial 3D model, deleted from the initial 3D model, or modified (e.g., shifted, enlarged, rotated, etc.). The updated model data may be stored, for example, in data storage 36 and/or in model storage 20.

At block 220, a request from the second user to obtain credit for or secure rights to the changes applied to the initial three-dimensional model may be received. For example, the request may be received at a user interface of a computing device, or the request may be received (for example, at a web server) from a web-browser used by the second user. At block 222, a rights indication may be generated and stored based on the received request. The rights indication may be stored in conjunction with metadata of the updated model data corresponding to the changes initiated by the second user. The rights indicator may indicate the credit for or the rights of the second user to the changes made to the initial model data corresponding to the initial 3D model. For example, the second user may be a creator or author of the changes to the initial 3D model, or may be some other owning party of the initial 3D model.

At block 225, an association between a second watermark and the updated 3D model data may be generated and stored. For example, the association between the second watermark and the updated 3D model may be generated based on a rights indication corresponding to the second user. The second watermark may be associated with the second user, and may be pre-defined or may be entered or selected by the second user. As the updated 3D model data is based on the initial model data, the stored association between the second watermark and the updated 3D model data may also indicate the first watermark or corresponding owning party. In some embodiments, the block 225 is omitted, such as when a visual indicator of the rights of the second user and the modification to the initial 3D model is not desired.

In some embodiments, the association between the second watermark and the updated 3D model may be stored in local and/or remote memory. In some embodiments, the association between the second watermark and the updated 3D model data may be stored with metadata corresponding to the changes or deltas made to the initial model data. The metadata corresponding to the changes or deltas may identify the second user as a creator or originator of the changes or deltas. Consequently, in some embodiments the metadata corresponding to the updated 3D model data may include indications of associations of the updated 3D model data with both the first watermark and the second watermark.

At block 228, a rendering of the updated 3D model may be displayed on a display presented at an output device, e.g., the output device 42, in conjunction with a rendering of the first watermark. Thus, the rendering on the display indicates the association between the first user and the credit or rights to the initial 3D model on which the updated 3D model is based. Additionally, in some embodiments, based on the association generated at the block 225, the second watermark may also be rendered on the display in conjunction with the updated 3D model. Typically, but not necessarily, the initial and second watermarks (if used) are rendered in the background of the display in gray scale. The initial watermark and the second watermark indicate the rights of the first user and of the second user, respectively, to at least portions of the updated 3D model.

At an optional block 230, the rendering of the appearance of the initial watermark and/or the rendering of the appearance of the second watermark (if used) may be modified. For example, a user may activate a user control on the display to hide, re-size, move or lighten one or both of the watermarks. In another embodiment, a user who does not have sufficient privileges may be prevented from hiding, re-sizing, moving and/or lightening one or both of the watermarks. The modifications to the one or more watermarks generally are temporary, and do not disturb the corresponding associations of the watermarks and their respective owning parties. Rather, the modifications to the rendering of the watermarks may be used for user convenience and readability. In some embodiments, a default display condition may render any watermarks to be present but invisible, and a toggle may cause the invisible watermarks to be made visible.

In some embodiments, if a user clicks on, mouses over, or otherwise selects or indicates a particular watermark, corresponding rights information may be displayed, e.g., in a pop-up window. In some embodiments, when a user mouses over or otherwise selects a component corresponding to changes (and associated rights) made by a user to an initial model, corresponding rights information may be displayed. For example, when a user mouses over a component of the model 72 that includes changes made by (and rights associated with) Chris, a pop-up window may include "Added by Chris" or similar, while the rights associated with Taylor to the base, initial model 62 are continuously displayed in the background as the watermark 135. In this example, the user may select the watermark 135 and information associated with the watermark 135 or with Taylor may be displayed (e.g., "ACME, Co. Widget Version 1.3, ©2011). The rights information may include levels of access or rights for various parties that correspond to the particular watermark, and may additionally or alternatively include information corresponding to one or more owning parties of the particular watermark. Content of the rights information may be obtained, for example, from the rights indications (70, 78).

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing a development framework for 3D modeling including rights control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of controlling rights to three-dimensional models, comprising:
    rendering, at a display device, an initial three-dimensional (3D) model and a first watermark, the first watermark corresponding to a first association between a first user and initial model data corresponding to the initial 3D model, the first watermark being indicative of rights of the first user to the initial model data, and the initial model data stored on a computer-readable medium;
    receiving, via a user interface, a user-initiated command from a second user to modify a portion of the initial 3D model;
    modifying, in accordance with the user-initiated command, a respective portion of the initial model data corresponding to the portion of the initial 3D model to form updated model data corresponding to an updated 3D model;
    generating and storing a second association between the second user and the updated model data corresponding to the modified respective portion of the initial model data;
    rendering the updated 3D model in conjunction with the first watermark and a second water mark corresponding to the second association between the second user and the modified respective portion of the initial model data, the second watermark being indicative of rights of the second user to the modified respective portion of the initial model data; and
    preventing the second user from disassociating the first watermark and the updated 3D model.

2. The method of claim 1, further comprising:
    receiving a request from the first user to secure the rights to the initial three-dimensional (3D) model, and in response to the request, generating a rights indication, the rights indication storing an indication of the rights of the first user to the initial model data corresponding to the initial 3D model; and
    wherein the first association between the first watermark and the initial model data is based on the rights indication.

3. The method of claim 2, wherein:
the rights indication is a first rights indication and the request is a first request; and
the method further comprises:
receiving a second request from the second user to secure rights to the updated 3D model, and in response to the second request, generating a second rights indication, the second rights indication storing an indication of rights of the second user to a portion of the updated model data corresponding to the modified respective portion of the initial model data; and
generating and storing the second association is based on the second rights indication.

4. A method according to claim 1, wherein rendering the updated 3D model in conjunction with the first watermark comprises rendering the first watermark in a background of a display that includes the rendering of the updated 3D model.

5. A method according to claim 1, further comprising providing user-indicated content in the rendering of the first watermark.

6. A method according to claim 1, further comprising:
including an indication of the first association in first metadata corresponding to the initial model data; and
including an indication of the second association in second metadata corresponding to the modified respective portion of the initial model data included in the updated model data.

7. The method of claim 6, further comprising including an indication of the first association corresponding to the initial model data in third metadata corresponding to the updated model data, the third metadata including the second metadata.

8. A method according to claim 1, wherein modifying the respective portion of the initial model data comprises applying a change to the respective portion of the initial model data, the change corresponding to at least one of an addition, a deletion, or a change to a characteristic of a component corresponding to the respective portion of the initial model data.

9. A method according to claim 1, wherein:
the user-initiated command is a first user-initiated command; and
the method further comprises:
receiving an indication of a second user-initiated command to hide the rendering of the first watermark; and
hiding the rendering of the first watermark in response to the receiving of the indication of the second user-initiated command.

10. A system for controlling rights to three-dimensional model data, comprising:
a first memory storing initial model data corresponding to an initial three-dimensional (3D) model, and storing an indication of a first association between a first user and the initial 3D model; and
computer-executable instructions stored on the first memory or on a second memory, the computer-executable instructions being executable by a processor to:
receive a user-initiated command from a second user to modify a portion of the initial 3D model;
apply a change, in accordance with the user-initiated command, to the initial model data to form updated model data corresponding to an updated 3D model;
store an indication of a second association between the second user and the change;
cause a rendering, on a display device, of a first watermark and a second watermark in conjunction with a rendering of the updated 3D model, wherein the first watermark corresponds to the first association and is indicative of rights of the first user to the initial model data and the second watermark corresponds to the second association and is indicative of rights of the second user to the updated model data; and
prevent the second user from disassociating the first watermark and the updated 3D model.

11. A system according to claim 10, wherein the rendering of the first watermark is in a background of a display including the rendering of the updated 3D model.

12. A system according to claim 10, wherein the first watermark includes user-indicated content.

13. A system according to claim 10, wherein the indication of the first association is included in first metadata corresponding to the initial 3D model, and wherein the indication of the second association is included in second metadata corresponding to the change.

14. A system according to claim 10, wherein the indication of the first association and the indication of the second association are included in metadata corresponding to the updated 3D model.

15. A system according to claim 10, wherein the first memory storing the initial model data is accessed by the second user via a web browser.

16. A system according to claim 10, wherein:
the second user is accorded a set of access privileges to the initial 3D model; and
the system further comprises additional computer-executable instructions to accord, to a third user, a different set of access privileges to the initial 3D model.

17. A system according to claim 16, wherein the different set of access privileges includes permission, for the third user, to at least one of: view the initial 3D model, add a new portion to the initial 3D model, delete a selected portion of the initial 3D model, export the initial 3D model, or copy the initial 3D model.

18. A non-transitory, tangible computer-readable medium comprising:
computer-executable instructions stored thereon and executable to:
receive a first request from a user to view an initial three-dimensional (3D) model;
cause the initial three-dimensional (3D) model and a first watermark corresponding to an owning party to be displayed, wherein the user is not the owning party;
receive a second request from the user to modify the initial 3D model;
apply a change, corresponding to the second request, to initial model data corresponding to the initial 3D model to generate updated model data corresponding to an updated 3D model;
store an indication of an association between an indication of the first watermark and the updated model data, the association being indicative of rights of the owning party to the initial 3D model;
store an indication of a second association between an indication of a second watermark and the updated model data, the second association being indicative of rights of the user to the updated model data; and
display the updated 3D model in conjunction with the first watermark and the second watermark.

19. A non-transitory, tangible computer-readable medium according to claim 18, wherein the computer-executable instructions stored thereon are further executable to prevent the user from disassociating the indication of the first watermark and the updated model data.

20. A non-transitory, tangible computer-readable medium according to claim 18, wherein the user is a first user, and the non-transitory, tangible computer-readable medium further comprises additional executable instructions stored thereon and executable to:
  receive a third request from a second user to at least one of view, copy, export, or
  modify the initial three-dimensional (3D) model;
  determine a level of access to the initial 3D model for the second user; and
  grant or deny the third request based on the level of access.

21. A non-transitory, tangible computer-readable medium according to claim 18, wherein the indication of the association between the indication of the first watermark and the updated model data is stored in metadata corresponding to the updated model data.

22. A non-transitory, tangible computer-readable medium according to claim 18, wherein the first request and the second request are received via a web browser.

23. A method in a computing device for controlling rights to a three-dimensional model, the method comprising:
  generating model data corresponding to a three-dimensional (3D) model in accordance with a plurality of commands received from a user via a user interface of the computing device, including invoking a plurality of modeling functions;
  generating an indication that the user has developed the 3D model;
  storing the indication along with the model data;
  rendering the 3D model at the user interface;
  in response to determining that the user has been granted a set of restricted rights to the plurality of modeling functions:
    rendering a watermark in conjunction with the rendering of the 3D model, wherein the watermark includes at least one of an image or text, and
    preventing the user from disassociating the watermark from the 3D model;
  modifying a respective portion of the initial model data corresponding to the portion of the initial 3D model to form updated model data corresponding to an updated 3D model;
  generating and storing a second indication between a second user and the updated model data corresponding to the modified respective portion of the initial model data:
  in response to determining that the second user has been granted a set of restricted rights to the plurality of modeling functions:
    rendering a second watermark in conjunction with the rendering of the updated 3D model and the rendering of the first watermark, wherein the second watermark includes at least one of an image or text and is simultaneously displayed with the first watermark, and
    preventing the user from disassociating the watermark from the 3D model, wherein the set of restricted rights granted to the second user is different from the set of restricted rights granted the first user.

24. A method according to claim 23, further comprising:
  in response to determining that the user has been granted an enhanced set of rights to the plurality of modeling functions, the enhanced set of rights having a greater number of rights than the set of restricted rights, disassociating the watermark from the 3D model,
  whereby the watermark is not rendered in conjunction with the rendering of the 3D model.

25. A method according to claim 23, wherein rendering the watermark includes rendering at least one of an image or text indicative of the set of restricted rights of the user to the plurality of modeling functions.

26. A method according to claim 23, wherein determining that the user has been granted the set of restricted rights to the plurality of modeling functions includes identifying a trial subscription corresponding to the user.

27. A method according to claim 23, wherein rendering the watermark in conjunction with the rendering of the 3D model includes causing the watermark to be displayed in a background of the rendering of the 3D model.

28. A method according to claim 23, further comprising preventing the user from disassociating the second watermark from the 3D model.

* * * * *